United States Patent [19]

Droz

[11] 4,422,686
[45] Dec. 27, 1983

[54] VEHICLE ROOF STRUCTURE

[75] Inventor: Ralph Droz, Westland, Mich.

[73] Assignee: American Sunroof Corporation, Southgate, Mich.

[21] Appl. No.: 328,212

[22] Filed: Dec. 7, 1981

[51] Int. Cl.³ .............................................. B60J 7/06
[52] U.S. Cl. .................................................. 296/219
[58] Field of Search ................. 296/219, 216; 220/350

[56] References Cited

U.S. PATENT DOCUMENTS

| | | | |
|---|---|---|---|
| 1,950,371 | 3/1934 | Baier | 296/137 |
| 2,861,836 | 11/1958 | Goeggel | 296/137 |
| 3,028,194 | 4/1962 | Werner | 296/219 |
| 3,658,378 | 4/1972 | Sutren | 296/137 C |
| 3,756,650 | 9/1973 | Michel | 296/137 C |
| 3,819,227 | 6/1974 | Carli | 296/219 |
| 3,820,840 | 6/1974 | Forsberg | 296/100 |
| 3,964,783 | 6/1976 | Fisher | 296/137 C |
| 3,986,749 | 10/1976 | Hull et al. | 296/137 B |
| 4,066,292 | 1/1978 | Carli | 296/137 C |
| 4,136,906 | 1/1979 | Ireland et al. | 296/137 C |
| 4,143,907 | 3/1979 | Ireland | 296/137 C |
| 4,154,473 | 5/1979 | Alexander et al. | 296/137 R |
| 4,209,196 | 6/1980 | Mocelin | 296/219 |

FOREIGN PATENT DOCUMENTS

| | | | |
|---|---|---|---|
| 132091 | 2/1933 | Austria | 296/219 |
| 1084587 | 6/1960 | Fed. Rep. of Germany | 296/219 |

Primary Examiner—Robert R. Song
Attorney, Agent, or Firm—Basile, Weintraub & Hanlon

[57] ABSTRACT

A roof structure for a vehicle includes a preformed cap attached to a rear portion of the stationary roof structure altering the roof lines thereof. A flexible decorative cover has a first portion attached to the cap and a second portion extending flexibly forward therefrom. Pairs of cross bows are perpendicularly disposed within a frame attached to the edges of an opening in the roof, with the first cross bow of each pair of cross bows being guided in guide tracks mounted along the sides of the frame. The cross bows of each pair of cross bows are attached at spaced intervals to the flexible second portion of the cover. Bias members are connected between the ends of the cross bows in each pair of cross bows to maintain the cross bows in each pair of cross bows a predetermined spaced distance apart. Cam members having inclined surfaces are attached to certain of the cross bows to urge the rearmost cross bows of the forward pair of cross bows upward and thereover as the flexible roof cover is urged rearward to create folds in the flexible second portion of the cover.

5 Claims, 7 Drawing Figures

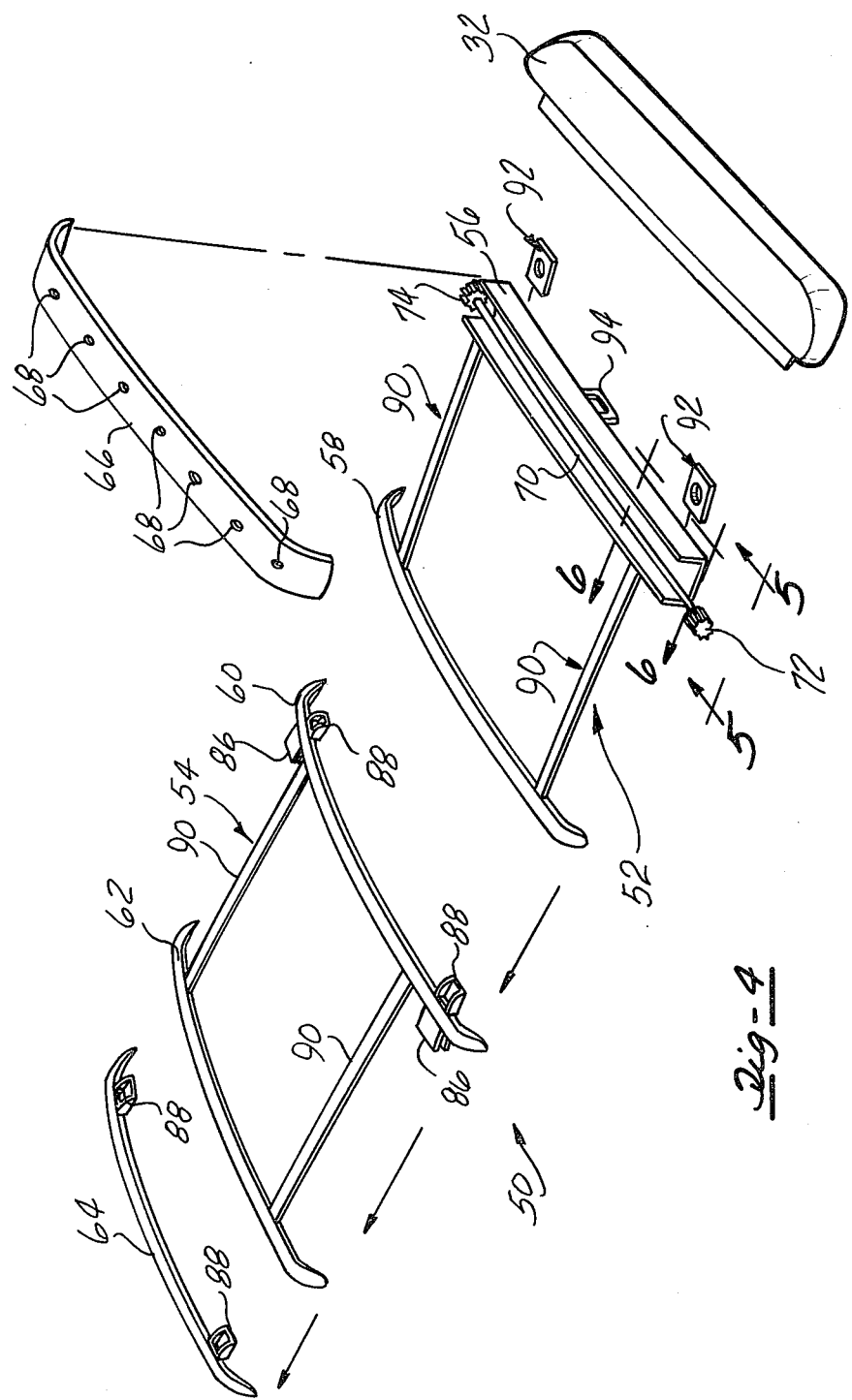

VEHICLE ROOF STRUCTURE

BACKGROUND OF THE INVENTION

1. Field of the Invention:

This invention relates, in general, to retractable roof structures for vehicles and, more specifically, to retractable roof structures for vehicles of the folding type formed of a flexible material.

2. Description of the Prior Art:

A large variety of vehicle roof structures have been devised in which all or a portion of the roof is selectively movable to open the interior of the vehicle to the external environment. These roof structures include the so-called "convertible" roof, sliding or ventilating rigid roof panels and flexible roof covers which fold in an accordion or zig-zag fashion to open a portion of the vehicle roof.

In the latter type of vehicle roof structure, the flexible cover is mounted to retractably cover an opening in the stationary roof structure of the vehicle. The flexible roof panel or curtain has a plurality of bows affixed on the underside thereof which ride in guide tracks mounted in a frame attached to the edges of the roof opening. Although this type of roof structure has found wide-spread use, it still possesses inherent disadvantages.

The flexible roof panel is typically formed of a flexible cloth or vinyl material and, thus, differs significantly in appearance from the surrounding metallic stationary roof structure. This detracts from the aesthetic appearance of the vehicle roof when the cover is in the fully closed position due to the "add-on" appearance of the flexible roof cover.

Thus, it would be desirable to provide a vehicle roof structure of the folding type which is adapted to retractably cover an opening in the vehicle roof. It would also be desirable to provide a vehicle roof structure of the folding roof type which overcomes the problems of similar prior art folding roof structures in matching the appearance of the surrounding vehicle roof panel. Finally, it would be desirable to provide a vehicle roof structure which provides the appearance of a full convertible top and yet only includes a retractable portion for uncovering a partial opening in the stationary roof panel of a vehicle.

SUMMARY OF THE INVENTION

The present invention comprises a roof structure for a vehicle which includes a pre-formed cap attached to a rear portion of the stationary roof structure of the vehicle altering the roof lines thereof. A flexible decorative cover has a first portion attached to the pre-formed cap and a second portion which extends forward beyond the cap. Pairs of cross bows are perpendicularly disposed within a frame attached to the edges of an opening in the roof of the vehicle, with the first cross bow of each pair being guided in suitably formed guide tracks mounted along the sides of the frame. The cross bows are attached at spaced intervals to the second portion of the cover. Bias members are connected between the ends of the cross bows in each pair of cross bows. Cam members having an inclined upper surface are attached to certain of the first cross bows of each pair of cross bows and urge the rearmost cross bows of the adjacent forwardmost pair of cross bows upward and over the adjacent cross bows as the flexible cover is urged rearward to create holds in the flexible second portion of the cover.

The vehicle roof structure of the present invention provides many advantages over similar prior art vehicle roof structures of the folding roof type. By providing a portion of the decorative cover over a pre-formed cap attached to the rear portion of the vehicle roof, which cover is flexibly mounted forward of the cap, the aesthetic appearance of the vehicle is maintained in that the entire roof structure is of one type, i.e., a complete decorative covering, in the same manner as the so-called convertible tops. This eliminates the "add-on" appearance of similar prior art folding type roof covers. In addition, the vehicle roof structure of the present invention achieves a "convertible" look despite the fact that only a portion of the cover is retractable to expose a partial opening in the vehicle roof.

BRIEF DESCRIPTION OF THE DRAWING

The various features, advantages and other uses of the present invention will become more apparent by referring to the following detailed description and drawing in which:

FIG. 4 is a perspective, exploded view of the retractable folding mechanism;

DESCRIPTION OF THE PREFERRED EMBODIMENTS

Figure 1:
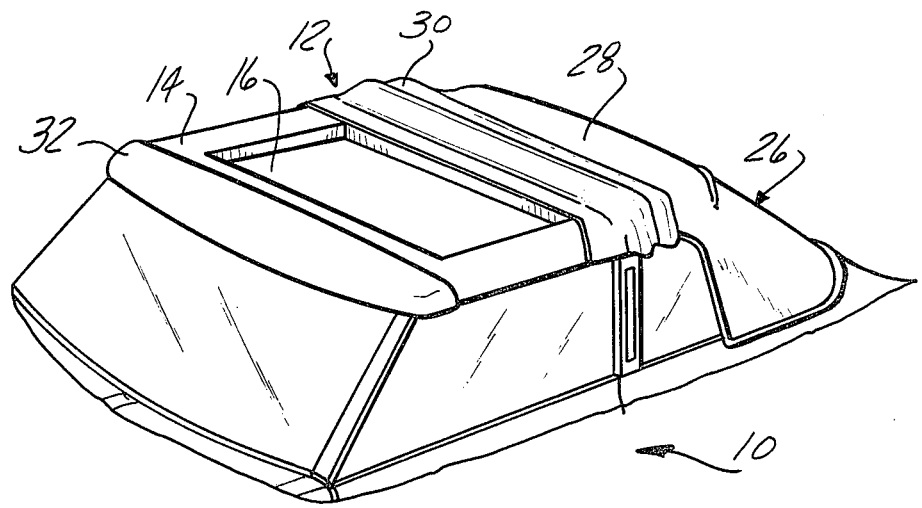
FIG. 1 is a perspective view of a vehicle roof structure constructed in accordance with the teachings of the present invention.

Throughout the following description and drawing, identical reference numbers are used to refer to the same component shown in multiple figures of the drawing.

Referring now to FIG. 1, there is illustrated a portion of a vehicle 10 having a roof structure 12 constructed in accordance with the teachings of the present invention. As is conventionally known, the vehicle 10 includes a stationary roof panel 14 which has an opening 16 formed therein. Preferably, the opening 16 is rectangular in configuration and is bounded on all four sides by stationary roof structure. Ideally, the opening 16 extends across the width of the vehicle and is positioned over the front seat of the vehicle in the known manner.

Figure 2:
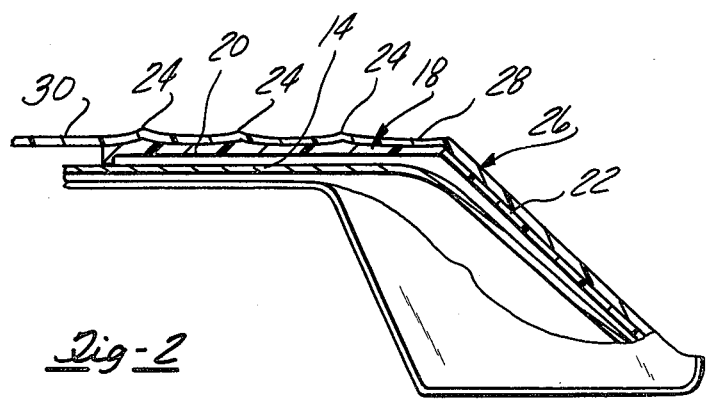
FIG. 2 is a partially sectioned elevational view of the vehicle roof structure of the present invention.

As is shown in FIGS. 1 and 2, the roof structure 12 of the present invention includes a pre-formed cap 18 which is secured over the rear portion of the stationary roof structure 14 of the vehicle. The cap 18 is constructed in the desired configuration and is formed preferably of fiberglass material. However, any other type of synthetic resinous material, such as an ABS resin, may also be used to form the cap 18.

The cap 18 is preferably formed with a top portion 20, depending side walls and a rear panel 22 having a central opening therein. In addition, the top portion 20 of the cap 18 may be formed with simulated ridges or ribs 24 which simulate the cross bows of a conventional so-called "convertible" soft top. As shown in FIG. 2, the cap 18 is attached only at the side and rear portions of the stationary roof structure to define a space between the inside thereof and the stationary roof panel 14. In this manner, the roof lines of the vehicle 10 may be altered as desired. The cap 18 is secured to the vehicle 10 in a conventional manner, such as by suitable fasteners or by means of adhesive bonding.

Additional details regarding the formation of the cap and its means of attachment to the vehicle may be had by referring to U.S. Pat. No. 4,154,473, the contents of which are incorporated herein by reference.

A decorative cover 26 formed of a flexible material, such as cloth or a plastic such as polyvinyl, is disposed over the cap 18. The cover 26 is provided with a decorative finish and may come in a variety of colors, textures and surface finishes. The cover 26 is attached to the cap 18 by any suitable type of adhesive material.

According to the preferred embodiment, the decorative cover 26 has a first portion 28 which is adhesively bonded in a fixed manner onto the pre-formed cap 18. The cover 26 also includes a second portion 30, shown in FIG. 1, which extends forward beyond the pre-formed cap 18 and is adapted to be folded in an accordion or zig-zag fashion, as described hereafter.

As shown in FIG. 1, the vehicle roof structure 12 of the present invention is provided with a front clip 32 having a similar decorative cover secured thereto. The front clip 32 is mounted adjacent the upper edge of the windshield of the vehicle 10 in proximity with the front edge of the opening 16 in the stationary roof structure 14 of the vehicle and is adapted to provide a contiguous surface with the flexible portion 30 of the cover 26 when the cover is in the fully closed position, as described in greater detail hereafter.

Figure 3:
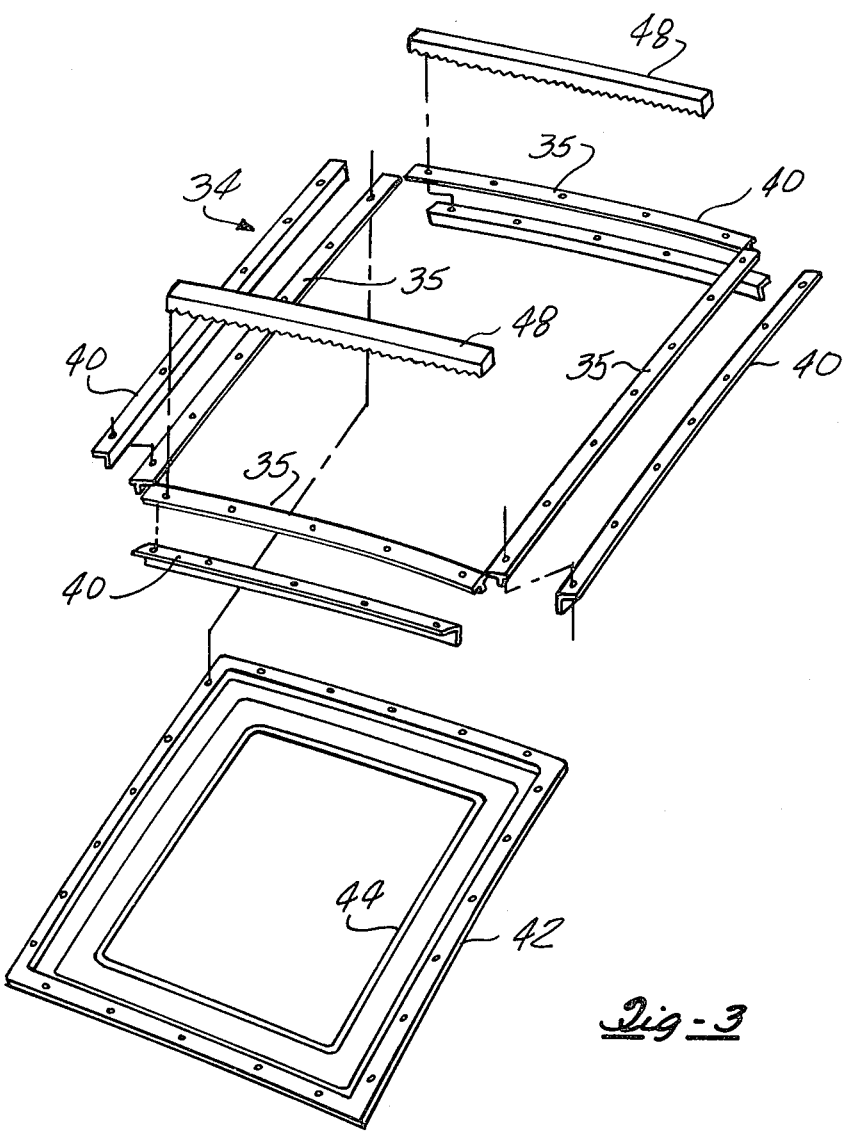
FIG. 3 is a perspective, exploded view of the frame assembly used for the flexible portion of the roof cover of the present invention.

Referring now to FIG. 3, there is illustrated a frame 34 which is adapted to be mounted within the opening 16 in the roof and be secured to the adjoining edges of the stationary roof panel 14. The frame 34 includes inner and outer frame assemblies. The outer frame assembly comprises four angle members 35 each having a top flange portion 36, illustrated in FIG. 6, and a central depending portion 38. The four angle members or brackets 35 are joined together at their ends into a unitary assembly having the approximate shape of the roof opening 16 into which it is disposed. When so mounted, the top portion 36 of the angle members 35 overlies the adjacent edges of the stationary roof panel 14.

Figure 6:
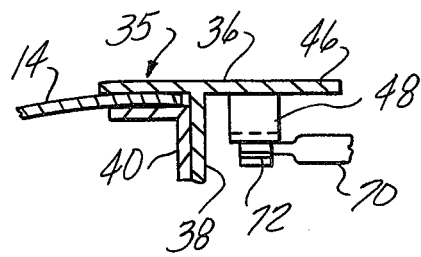
FIG. 6 is a cross sectional view generally taken along line 6—6 in FIG. 4.

The frame 34 also includes an inner frame assembly in the form of angle brackets 40, FIGS. 3 and 6, which are disposed interiorly within the vehicle adjacent the underside of the stationary edges of the roof panel 14 and abut the depending flange 38 of the outer frame angle members 35. Suitable fasteners, such as bolts, may be inserted between the outermost edges of the flanges 36 and the angle brackets 40 to securely mount the frame 34 to the stationary roof structure 14 of the vehicle.

An inner trim assembly 42 comprising a unitary stamping having a central aperture is mounted interiorly within the vehicle adjacent the opening 16. The inner trim assembly 42 functions to cover the internal mechanism of the folding roof structure of the present invention. The interior headliner of the vehicle may be wrapped around the central aperture in the inner frame assembly 42 and secured in position by means of a welt cord 44 in the known manner.

Guide means are also provided in the frame 34 for directing movement of the folding mechanism of the present invention. The guide means includes an innermost extending portion of the upper flange 36 of the outer frame angle members 35 as well as an elongated rack 48 having a plurality of gear teeth spaced linearly along its length. The rack 48 is disposed longitudinally within the frame 34 along the sides of the roof opening 16 and is mounted by suitable fasteners to the underside of the upper flange 36 of the angle members 35, as illustrated in the FIG. 6.

Referring now to FIG. 4, there is shown a folding mechanism 50 for retracting the flexible second portion 30 of the decorative cover 26. The folding mechanism 50 includes pairs 52 and 54 of the first and second cross bows. The first pair 52 of the cross bows includes first and second cross bows 56 and 58, respectively; while the second movable pair 54 of cross bows includes first and second cross bows 60 and 62, respectively. A third rearmost cross bow 64 is positioned in proximity with the forwardmost edge of the pre-formed cap 18.

The cross bows 56, 58, 60, 62 and 64 are oriented substantially perpendicular to the longitudinal axis of the frame 34. Each of the cross bows is attached, by suitable means, to the underside of the flexible portion 30 of the decorative cover 26. Thus, cross bows 58 and 62 are slidably disposed within pockets attached to the underside of the flexible portion 30 of the decorative cover 26; while cross bows 56, 60 and 64 have the flexible portion 30 attached to the top surface thereof by suitable means, such as an adhesive bond.

In each pair of cross bows, such as pairs 52 and 54, the first cross bows 56 and 60 are guided in the guide means attached to the frame 34; while the second rearmost cross bows 58 and 60, respectively, are freely mounted within the frame 34.

As shown in FIG. 4, the first cross bow 56 of the first pair 52 of cross bows has a substantially U-shaped channel configuration. A rigid cover 66 is provided to close the open top portion of the channnular cross bow 56 and is secured thereto by suitable fasteners inserted through apertures 68.

A rotatable elongated rod 70 is disposed within the interior of the first cross bow 56 and has pinion gears 72 and 74 mounted at opposed ends thereof. The pinion gears 72 and 74 are adapted to engage the teeth of the racks 48 mounted in the frame 34 and function to guide the first cross bow 56 rearward and forward within the frame 34 such that the opposed ends of the first cross bow 56 move in a simultaneous linear fashion along the racks 48.

Figure 5:
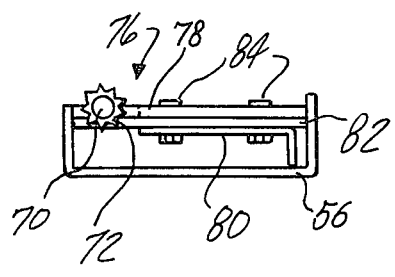
FIG. 5 is a cross sectional view generally taken along line 5—5 in FIG. 4.

As shown in FIG. 5, biasing means 76 are provided within the first cross bow 56 for biasing the pinion gears 72 and 74 into engagement with the teeth of the rack 48. The biasing means 76 includes an upper metallic plate 78, an angular lower plate 80 and an inner biasing means 82 in the form of a teflon coated spring steel strip. The assembly is secured together by suitable fasteners 84, which extend through the upper and lower plates 78 and 80 and the biasing means 82, with increased tension on the fastening means providing increased biasing force on the biasing member 82. One end of the biasing member 82 abuts the elongated rod 70 and functions to urge rod 70 upward so as to maintain the pinion gears 72 and 74 in engagement with the racks 48 as the first cross bow 56 is moved rearward and forward within the roof opening.

The first cross bows of the remaining pairs of cross bows, such as cross bow 60 of the second pair 54 of cross bows, are provided with a pair of suitably formed guide shoes 86, FIG. 4, which are secured to the outermost ends of the cross bow 60. The guide shoes 86 are adapted to ride along the innermost portion 46 of the upper flange 36 of the angle member 35, shown in FIG. 6, to guide the first cross bow 60 rearward and forward within the roof opening.

Certain of the cross bows, such as cross bows 60 and 64, are provided with cam means 88 having inclined upper surfaces which are adapted to urge the adjacent forwardmost cross bow of the adjacent pair of cross bows upward so as to form folds in the flexible portion 30 of the decorative cover 26, as described hereafter.

The cam means 88 are attached to the outermost ends of the respective cross bows to engage the corresponding second cross bow of the forward adjacent pair of cross bows.

As shown in FIG. 4, each cross bow of each respective pair of cross bows also includes biasing means 90 in the form of an elongated flexible strip which extends between and is secured to the first and second cross bows of each pair of cross bows. The biasing means 90 function to maintain a predetermined distance between the cross bows in each pair of cross bows as the flexible portion 30 of the decorative cover 26 is moved forward and rearward within the vehicle opening so as to form a rigid, substantially flat roof surface when the roof cover is in the fully closed position and, at the same time, to create accordion-like folds in the flexible portion 30 when the roof cover is moved to the fully opened position.

Suitable latch means 92 are provided for releasably latching the roof cover in the fully closed position. The latch means 92 is formed of a two-piece latch assembly having a first portion connected to the first cross bow 56 and a retainer or latch member secured to the underside of the stationary roof structure of the vehicle. In addition, a handle 94 depends from the underside of the first cross bow 56 to provide a means for manually retracting and closing the flexible roof portion 30 of the vehicle roof structure.

Figure 7:
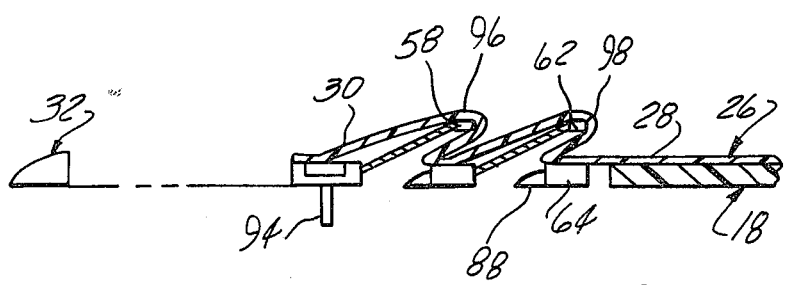
FIG. 7 is a partial sectional view showing the flexible portion of the roof structure of the present invention.

In operation, the handle 94 is grasped and urged rearward by the occupant of the vehicle. During such movement, the biasing members 90 extending between the first and second cross bows 56 and 58 of the first pair 52 of cross bows maintain the predetermined spacing between the first and second cross bows 56 and 58. As the first pair 52 of cross bows is urged rearward, the second rearmost cross bow 58 engages the cam means 88 attached to the forward edge of the cross bow 60 and is urged upward and over the first cross bow 60 of the second pair 54 of cross bows. In this manner, a portion of the flexible portion 30 of the decorative cover 26 will be urged upward to create a fold 96, as shown in FIG. 7.

Rearward movement of the first cross bow 56 will continue until it abuts the first cross bow 60 of the second pair 54 of cross bows. This will cause the first cross bow 60 of the second pair 54 of cross bows to begin moving in a rearward direction. During such rearward movement of the second pair 54 of cross bows, the biasing members 90 will maintain the pre-determined spacing between the first and second cross bows 60 and 62. The second cross bow 62 will eventually abut the cam means 88 affixed to the third cross bow 64 and be urged up and over the third cross bow 64 to create a second fold 98 as shown in FIG. 7. Rearward movement of the flexible portion 30 of the roof cover of the present invention can continue until the first cross bow 60 of the second pair 54 of cross bows abuts the cross bow 64. In this manner, the opening 16 in the stationary roof structure 14 of the vehicle will be completely exposed to view.

A reverse operation is utilized to move the retracted portion of the cover 26 to the fully closed position at which time the latch means 92 are engaged to lock the roof in a fully closed position. In the fully closed position, the flexible portion 30 will be fully extended to form a contiguous surface with the fixed first portion 28 attached to the pre-formed cap 18 and the front clip 32.

In the roof structure of the present invention, the aesthetic appearance of a full convertible roof is achieved, with only a portion thereof being retractable to expose a partial opening in the stationary roof structure of the vehicle to view. Thus, the features of a partial roof opening, substantial roof structural integrity and the elimination of the complex, space consuming and costly retracting mechanisms associated with conventional convertible tops are achieved.

What is claimed is:

1. A vehicle roof structure having an opening surrounded by a stationary roof structure adapted to be retractably closed by a folding roof cover comprising:
    a pre-formed cap mounted on a rear portion of the stationary roof structure of the vehicle;
    a decorative cover having a first portion fixedly secured to the pre-formed cap and a second portion extending flexibly forward therefrom;
    a frame mounted in the roof opening and secured to the stationary roof structure along the edges of the roof opening;
    guide track means formed along the longitudinal sides of the frame;
    pairs of first and second cross bows extending substantially perpendicular to the longitudinal axis of the frame, the pairs of first and second cross bows attached at spaced intervals along the flexible second portion of the cover;
    the first cross bow of each pair of cross bows having opposed ends riding in the guide track means for retractably and extensibly sliding the flexible cover over the roof opening;
    biasing means, extending between each of the first and second cross bows in each pair of cross bows, for maintaining a predetermined distance between the first and second cross bows;
    means, attached to the forward end of certain of the first cross bows of the pairs of cross bows for urging the second cross bows of the adjacent forwardmost pair of cross bows upward and thereover as the flexible portion of the cover is urged in a rearward direction uncovering the roof opening to create folds in the flexible portion of the cover; and
    means, attached to the forwardmost first cross bow, for latching the flexible portion of the cover in a fully closed position.

2. The vehicle roof structure of claim 1 wherein the biasing means comprises a pair of flexible strips connected to the first and second cross bows of each pair of cross bows at opposed ends thereof.

3. The vehicle roof structure of claim 1 wherein the guide track means includes longitudinally extending racks mounted in the sides of the frame; and a rotatable rod carried within the forwardmost first cross bow and having pinion gears mounted at opposed ends thereof adapted to mesh with the racks and guide the first cross bow longitudinally along the frame.

4. The vehicle roof structure of claim 3 wherein the rearmost first cross bow of the pairs of cross bows has guide shoes mounted at opposed ends thereof for slidingly engaging guide tracks formed in the frame.

5. The vehicle roof structure of claim 1 further including a second cap having a decorative covering attached thereto, the second cap mounted on the vehicle roof adjacent the front edge of the roof opening so as to form a contiguous surface with the flexible portion of the cover when the cover is moved to the fully closed position.

* * * * *